United States Patent
Heo

(10) Patent No.: US 6,233,233 B1
(45) Date of Patent: May 15, 2001

(54) DISTRIBUTED PACKET HANDLING APPARATUS FOR USE IN A PACKET SWITCH

(75) Inventor: Vi-Tus Heo, Incheon (KR)

(73) Assignee: Mercury Corporation, Incheon (KR)

( * ) Notice: Subject to any disclaimer, the term of this patent is extended or adjusted under 35 U.S.C. 154(b) by 0 days.

(21) Appl. No.: 09/057,372

(22) Filed: Apr. 9, 1998

(30) Foreign Application Priority Data

Apr. 9, 1997 (KR) .................................................. 97-13029
Apr. 9, 1997 (KR) .................................................. 97-13030
Apr. 9, 1997 (KR) .................................................. 97-13031
Apr. 9, 1997 (KR) .................................................. 97-13032

(51) Int. Cl.[7] ........................................................ H04J 3/26
(52) U.S. Cl. ............................................ 370/352; 370/524
(58) Field of Search ..................................... 370/352, 353, 370/354, 524

(56) References Cited

U.S. PATENT DOCUMENTS 5,805,570 * 9/1998 Fields et al. ......................... 370/241

* cited by examiner

*Primary Examiner*—Melvin Marcelo
(74) *Attorney, Agent, or Firm*—Bacon & Thomas, PLLC

(57) ABSTRACT

An integrated services digital network (ISDN) switch capable of switching packets in each of access switching subsystems, includes a plurality of access switching subsystems including a time switch, for providing interfaces with subscriber equipments by using the ISDN standard interfaces; an interconnection network subsystem including a space switch, connected to the access switching subsystems, for performing functions such as space switching and network synchronization; and a central control subsystem, connected to the interconnection network subsystem, for supervising and controlling overall functions performed in each subsystem in the ISDN switch.

9 Claims, 7 Drawing Sheets

DISTRIBUTED PACKET HANDLING APPARATUS FOR USE IN A PACKET SWITCH

FIELD OF THE INVENTION

The present invention relates to a packet switch; and, more particularly, to a packet handling apparatus functionally distributed among subscriber modules for use in the packet switch.

BACKGROUND OF THE INVENTION

A data communication technology making use of a "packet" is widely employed in a data communication network, wherein the packet is a sequence of binary digits including data, call control signals and possibly address which are arranged in a specific format. Perhaps the best known and most widely used protocol standard of a data communication is X.25 protocol. The X.25 specifies an interface between a host system and a packet-switched network.

With the improvement in transmission technology and switching facilities, a new packet communication scheme, "frame relay", has been becoming highlighted and won popularity. The communication scheme using the frame relay, principally based on the X.25, eliminated as many overhead of the X.25 as possible. Thus, the frame relay can be viewed as a streamlined version of the X.25.

As an Integrated Services Digital Network (ISDN) accommodates the frame relay to a large degree, a capability of performing a packet switching for the frame relay is regarded essential in an ISDN switching system.

Since the ISDN switch accommodates a packet switching as well as a circuit switching, in practice, the packet switch can be regarded as sub-functions of the ISDN switch.

A skeleton of the ISDN switch, or the packet switch, is shown in FIG. 1.

The packet switch incorporates itself into major subsystems such as an access switching subsystem (ASS) 100, an interconnection network subsystem (INS) 110 and a central control subsystem (CCS) 120.

The ASS 100 interconnects itself with subscribers on one side and the INS 110 on the other side. The ASS 100 performs call processing, call flow control, time switching functions, and the like.

The INS 22, connected to the ASS 100, is designed for performing space switching, network synchronization and the like.

The CCS 120 supervises and controls overall functions performed in each subsystem in the packet switch.

In the ASS 100, a plurality of access switching subsystems for ISDN subscriber (ASS-I) 101 to 103 are incorporated. The ASS-I provides interfaces by using the ISDN standard interfaces such as I430, I441 and I451. An ISDN subscriber is able to gain access to the packet switch and finally reach another ISDN subscriber with the help of these ISDN standard interfaces and protocols.

An access switching subsystem for packet (ASS-P) 104 designed for handling packets is also included in the ASS 100. All the packets exchanged between subscribers pass and are handled by the ASS-P 104. The ASS-P 104 is not directly connected to subscribers but is connected to the INS 110.

Meanwhile, FIG. 2 provides a closer look at the ASS 100.

A basic rate subscriber interface block (BSI) 201, a primary rate subscriber interface block (PSI) 202 and a basic access rate multiplexing interface block (BAMI) 203 provide different types of interfaces to provide services for various kinds of communication services from ISDN subscribers.

An ISDN subscriber access processor (ISAP) 204 is employed in order to control functions of the BSI 201, the PSI 202 and the BAMI 203.

An inter-processor communication (IPC) network 205 is designed for communications between processors in the ASS-I 101.

An access switching processor-ISDN (ASP-I) 206 is designed for controlling operations occurring within the ASS-I 101. A time switch processor (TSP) 207 controls the operation of a time switch (TSW) 208.

The TSW 208 performs a time slot interchange as a typical time switch does. The TSW 208 constitutes a typical T-S-T switching structure together with another TSW and a space switch (SSW) (not shown).

A detailed inner structure of the ASS-P 104 is described in FIG. 3.

The ASS-P 104 presents a layered structure including packet handling modules (PHMs) 301 to 303, packet layer control processors (PLCPs) 305 to 307 and an access switching processor for packet (ASS-P) 309.

Herein, the PHMs 301 to 303 handle the X.25 and an X.75 protocol. The PHMs 301 to 303 are classified into a PHM-B for handling a B-channel packets based also on the X.25 protocol, a PHM-D for handling D-channel packets based on the X.25 protocol and a PHM-P for providing inter-working services between the ISDN and a public switched packet data network (PSPDN) based on the X.75 protocol.

The PLCPs 305 to 307 perform call processing for packets, and handle routing information.

The ASP-P 309 controls connection and disconnection between the ASS-P 104 and subscriber modules such as the BSI 201, the PSI 202 and the BAMI 203.

A time switch processor (TSP) 310 controls the operation of a time switch (TSW) 311.

The PLCPs 305 to 307 communicate with the PHMs 301 to 303 via a packet bus (P-bus) 304; and communicate with the ASP-P 309 and the TSP 310 by using an inter-processor communication (IPC) network 308.

The above-described conventional packet switch, however, presents some disadvantages.

A packet switching service can be blocked in case of a malfunction or a breakdown of the ASS-P 104 since all the packet data is processed in the ASS-P 104.

In addition, the conventional packet switch leaves something to be desired. In case that a sending subscriber and a receiving subscriber happen to be connected to the same ASS-I, all the packets to be exchanged between the subscribers must pass the ASS-P 104. Time for processing packets is rather longer when the sending subscriber and the receiving subscriber are connected to the same ASS-I than connected to different ASS-Is. In other words, the path the packets travel in the packet switch is ASS-I—SSW (in the INS 110)—ASS-P—SSW (in the INS 110)—ASS-I. In this case, it is desired to have a scheme that the packet data is processed only at the ASS-I, not passing through the SSW.

SUMMARY OF THE INVENTION

It is, therefore, a primary object of the present invention to provide a packet handling apparatus functionally distributed among subscriber modules for use in the packet switch.

In accordance with the present invention, there is provided an integrated services digital network (ISDN) switch capable of switching packets in each of access switching subsystems. The inventive ISDN switch comprises: a plurality of access switching subsystems including a time switch, for providing interfaces with subscriber equipments by using the ISDN standard interfaces; an interconnection network subsystem including a space switch, connected to the access switching subsystems, for performing functions such as space switching and network synchronization; and a central control subsystem, connected to the interconnection network subsystem, for supervising and controlling overall functions performed in each subsystem in the ISDN switch.

BRIEF DESCRIPTION OF THE DRAWINGS

The above and other objects and features of the present invention will become apparent from the following description of preferred embodiments given with reference to the accompanying drawings, in which.

DETAILED DESCRIPTION OF THE PREFERRED EMBODIMENT

Figure 5:
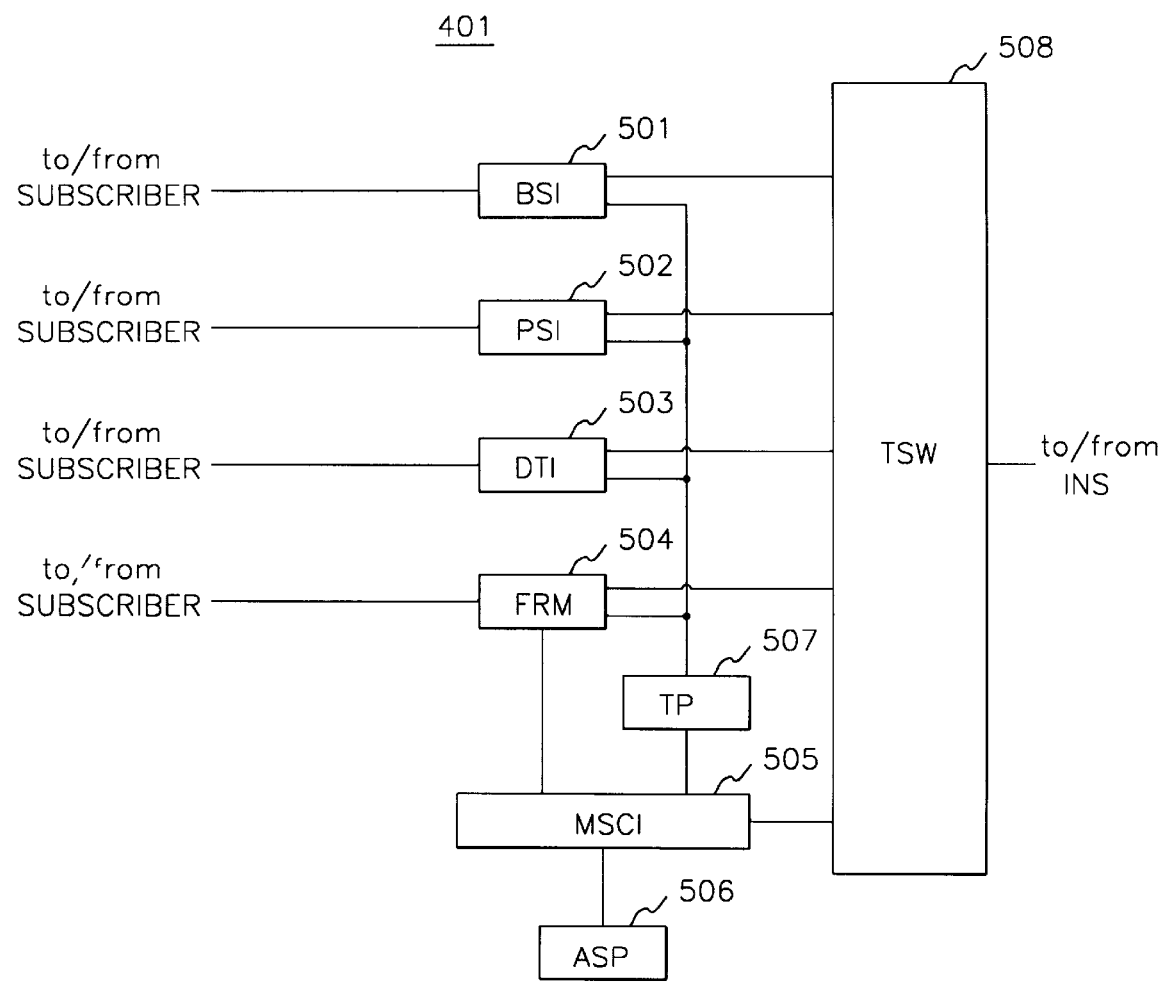
FIG. 5 depicts in detail the access switching subsystem for ISDN subscriber shown in FIG. 4.

In contrast to a conventional packet switch, an inventive packet switch does not include therein any packet handler module exclusively dedicated in handling packet data like the ASS-P 140. Instead, each of ASS-Is 401 to 403 contains itself a frame relay module (FRM) 504 as illustrated in FIG. 5 in order to process packets.

Figure 1:
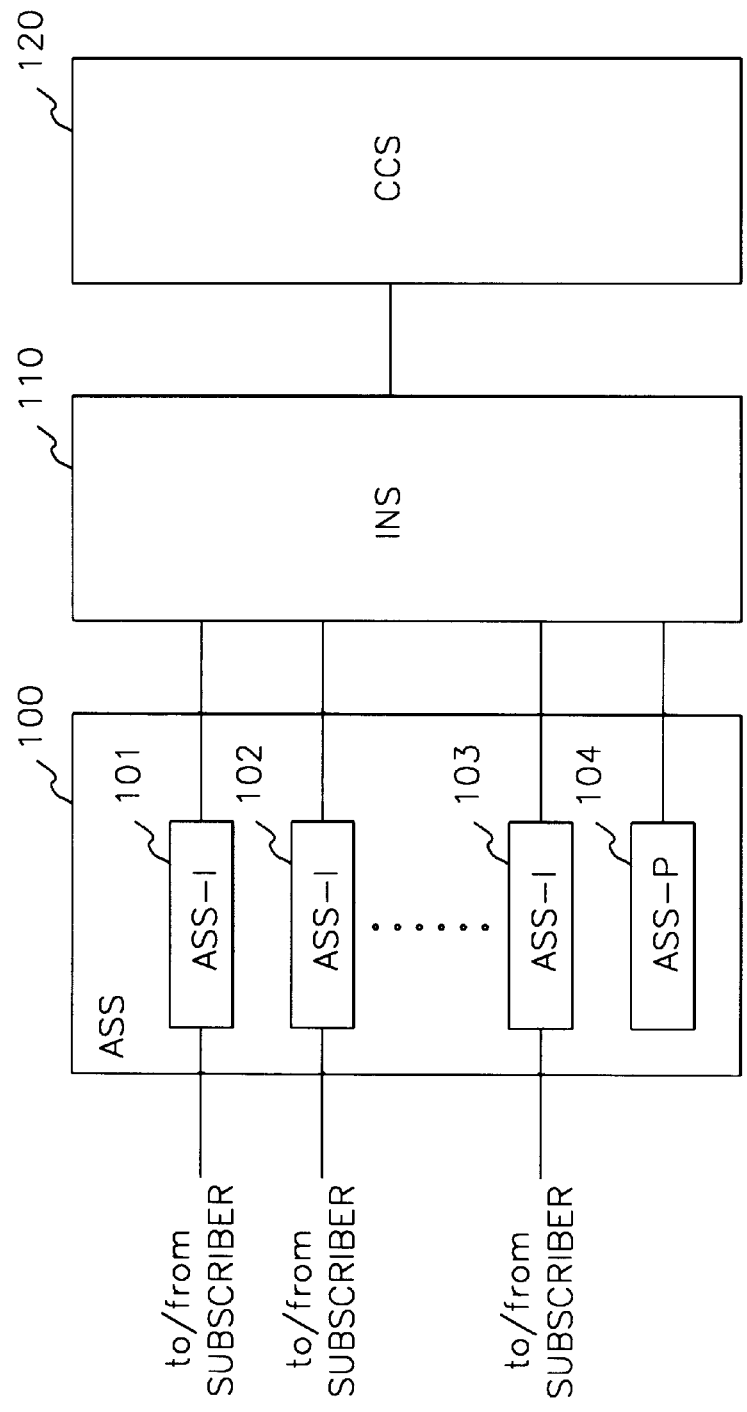
FIG. 1 describes major parts of a typical packet switch.
Figure 2:
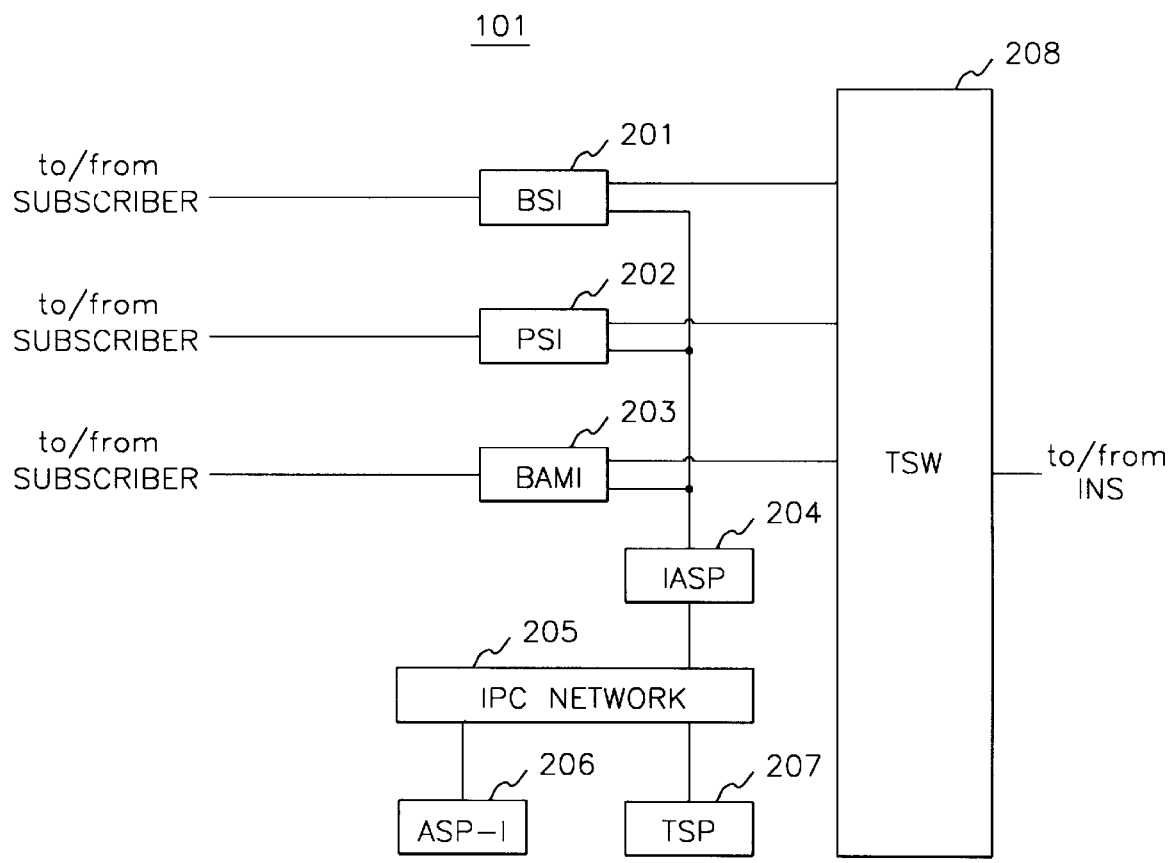
FIG. 2 illustrates in detail the access switching subsystem for ISDN subscriber shown in FIG. 1.
Figure 3:
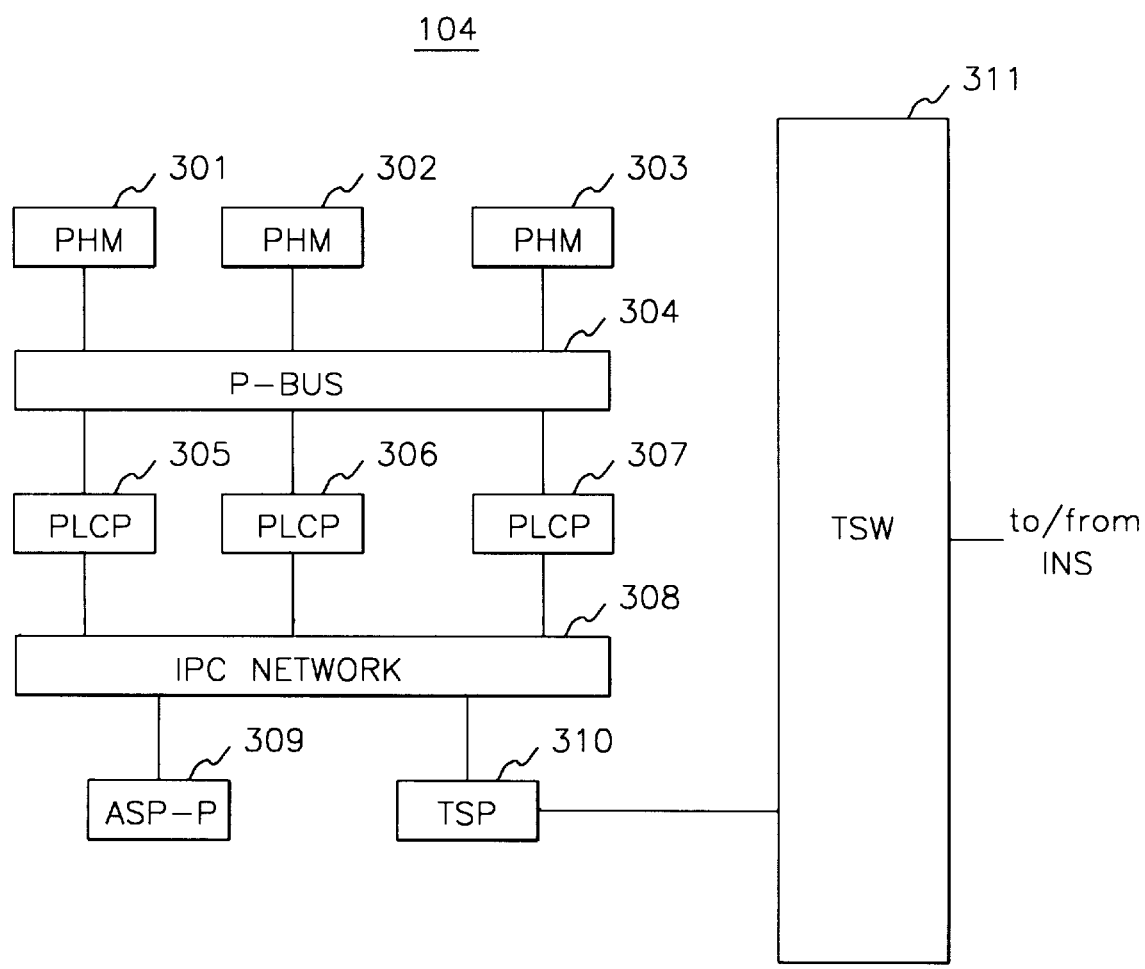
FIG. 3 describes in detail the access switching subsystem for ISDN subscriber shown in FIG. 1.
Figure 4:
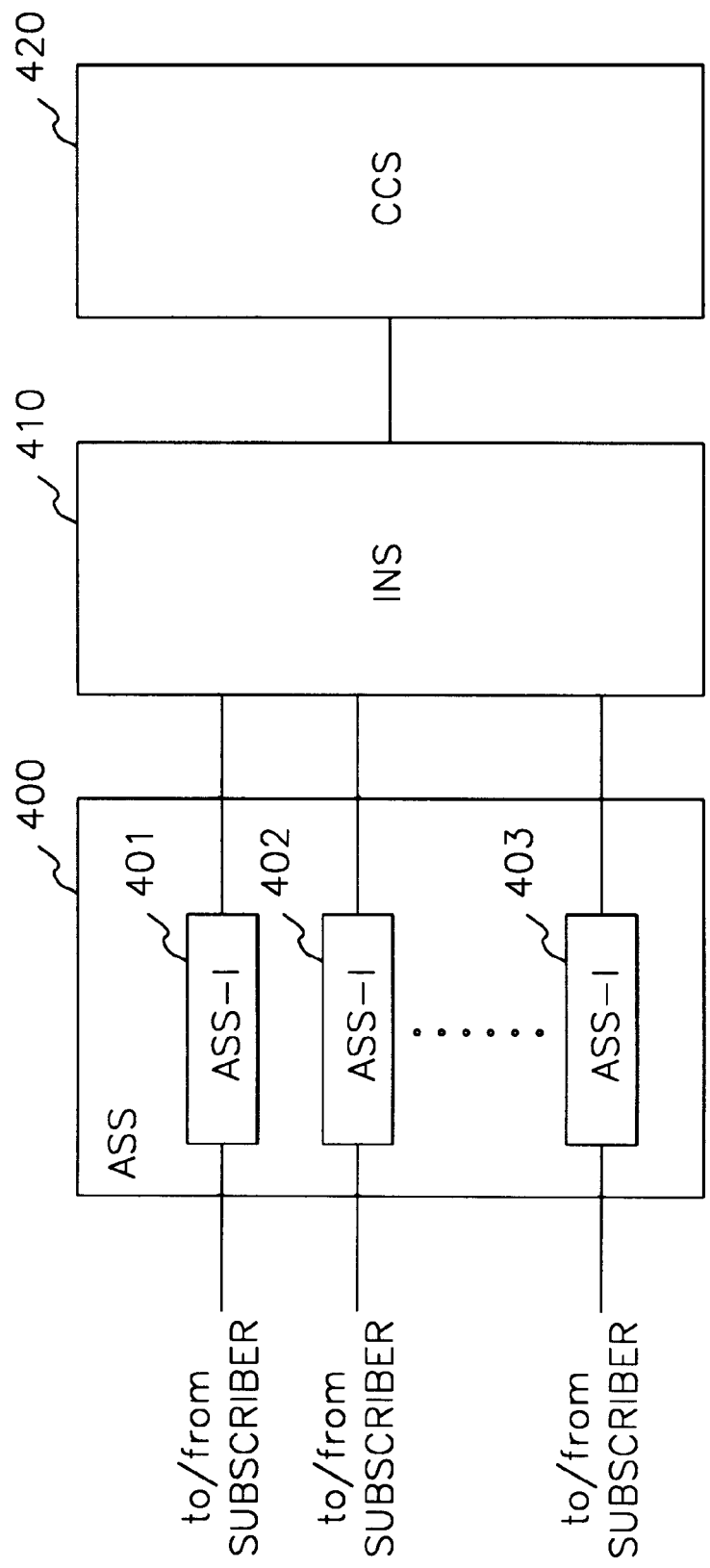
FIG. 4 shows major parts of a packet switch incorporating an inventive apparatus.

FIG. 4 shows major parts of a packet switch in accordance with the present invention. An interconnection network subsystem (INS) 410 and a central control subsystem (CCS) 420 are identical to those of the conventional packet switch. But access switching subsystems for ISDN subscriber (ASS-Is) 401 to 403 are different from those of conventional ones mainly in that each of them includes packet handling functions. As shown in FIG. 5, each of the access switching subsystems for ISDN subscriber (ASS-I) 401 to 403 includes therein a basic rate subscriber interface block (BSI) 501, a primary rate subscriber interface block (PSI) 502, a digital T-1 interface block (DTI) 503, a frame relay module (FRM) 504, a message switching for control inter-working (MSCI) 505, an access switching processor (ASP) 506 and a telephony processor (TP) 507. A time switch (TSW) 508 is connected to each ASS-I, more specifically, to the BSI 501, the PSI 502, the DTI 503, the FRM 504 and the MSCI 505.

The BSI 501 serves to provide a 64 kbps bearer service; and the PSI 502 serves to provide a higher rate primary service and maintains a time slot sequence of N×64 kbps (1<N<30) signal so that the TSW 508 can transparently transfer 64 kbps signal.

The DTI 503 performs functions related to an exchange of packets between packet switches.

The FRM 504 performs functions related to a link layer of a frame relay service. It is capable of accommodating services of an $H_0$, an $H_{11}$, an $H_{12}$, and thus, provides services for 64 kbps to 1.192 Mbps packets.

The MSCI 505 provides communication paths between processors incorporated in the ASP 506 and the TP 507, between processors residing in different subsystems, and between FRMs residing in different subsystems.

The ASP 506 performs higher level processing of a packet call processing. For example, it is responsible for a connection and disconnection between a subscriber and the FRM 504, manages a configuration of the FRM 504, and performs a data link connection identifier (DLCI) negotiation and a quality of service (QoS) negotiation.

The TP 507 controls devices such as the BSI 501, the PSI 502, the DTI 503, the FRM 504 and the like. It also performs a frame routing, a link layer control, an error restoration and a flow control. In addition, the TP 507 executes functions about an operation, a maintenance and functions collecting statistics concerning a packet handling.

The TSW 508 provides a connection path through which packets flow between the FRM 504 and the subscriber modules such as the ESI 501, PSI 502 and DTI 503. For the packet switch to provide an H-channel service, the TSW 508 implements a time slot sequence integrity by using duplicated buffers therein (not shown).

Contrary to the conventional packet switch, which uses the SSW (not shown) as a path through which packets flow, the packet switch in accordance with the present invention does not have to use the SSW as a path through which packets flow.

In accordance with the present invention, the path through which packets flow, in case that communicating subscribers are connected to the same ASS-I, is: a subscriber —PSI-TSW-FRM-TSW-PSI—another subscriber. On the other hand the path through packets flow, in case that communicating subscribers are connected to different ASS-Is, is: a subscriber —PSI-TSW-FRM-MSCI-SPCI-MSCI-TSW-PSI—another subscriber. Herein, a terminal equipment (TE) and a network termination (NT), which are typically employed between a subscriber and the packet switch in an ISDN network, are excluded from the above paths for the purpose of simpler illustration.

Figure 6:
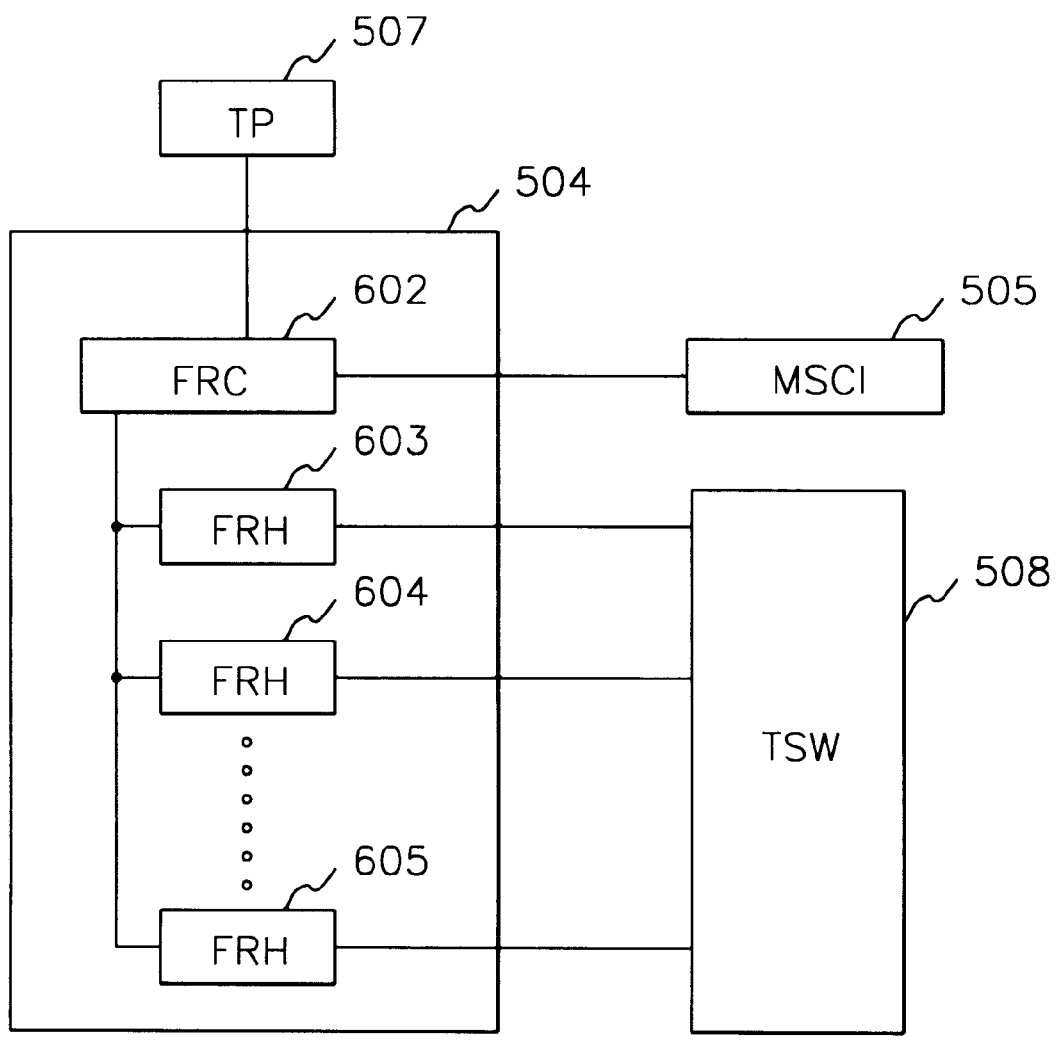
FIG. 6 presents in detail the frame relay module shown in FIG. 5.

Referring to FIG. 6, there is presented in detail the FRM 504 shown in FIG. 5.

The FRM 504 includes a plurality of frame relay handlers (FRHs) 603 to 605 and a frame relay controller (FRC) 602. A FRH being connected to the TSW 508 with a subhighway, a 4 Mbps channel with 64 time slots, receives packets from the subscriber, processes the received packets and finally hands them over to another FRH for packet exchange. The FRC 602 coordinates the above-mentioned packet exchange between the FRHs 603 to 605.

The FRC 602 is connected to the MSCI 505, which enables the FRC 602 to exchange packets with an ASS-I to which the FRC 602 does not belong. Also, the FRC 602 is connected to the TP 507, and thus, is able to exchange packets with the TP 507 by using a high-level data link control (HDLC) for call processing as well as for exchanging information on operation and maintenance.

Figure 7:
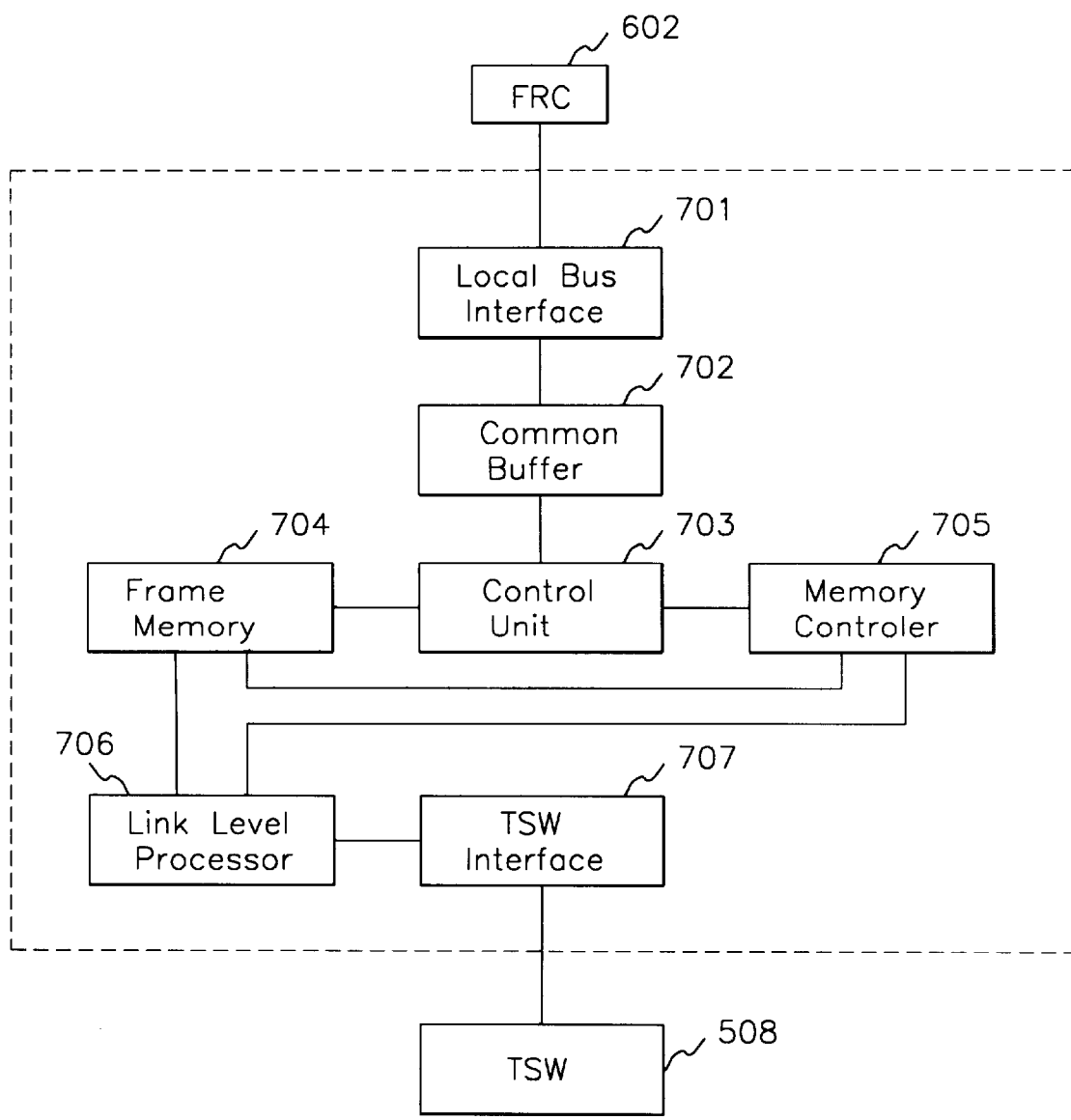
FIG. 7 illustrates a block diagram of the frames relay handler shown in FIG. 6.

The detailed structure of each of the FRHs 603 to 605 is illustrated in FIG. 7.

As shown in FIG. 7, each of the FRHs 603 to 605 incorporates a local bus interface 701, a common buffer 702, a control unit 703, a frame memory 704, a memory controller 705, a link level processor 706 and a TSW interface 707.

The TSW interface 707 connects itself to the link level processor 706 as well as to the TSW 508. It exchanges packets with the TSW 508 via a path at a data rate of from 64 kbps to 1.092 Mbps and also performs a bit rate control.

The link level processor 706 deals with packets by executing a link access protocol for frame relay (LAPF). It also stores packets to the frame memory 704 with the help of an arbitration of the memory controller 705. In addition, the link level processor 706 performs a cyclic redundancy check (CRC) and performs a multiplexing and de-multiplexing of the packets.

The frame memory 704 stores the packets coming from the link level processor 706 with the help of the arbitration of the memory controller 705. Packet exchange between the FRHs 603 to 605 is performed by using a local bus (not shown) and by using the MSCI 505, wherein, the local bus is a 16-bit parallel path including an interrupt line for use in utilizing an interrupt as of transmitting and receiving packets. That is to say, the control unit 703 exchanges packets with the MSCI 505 via the local bus interface 701 and the common buffer 702 after fetching the packets from the frame memory 704. The MSCI 505 transfers the packets to and from another FRH via the TSW 508.

The local bus interface 701 interfaces between the local bus and the common buffer 702. The common buffer 702 is for temporarily storing packets exchanged between the local bus and the control unit 703, and in turn, for controlling a packet flow.

The control unit 703, besides aforementioned functions, performs functions such as general control, error detection and congestion control by using an operating system functioning a real-time disk management, memory management and time management. Referring to the congestion control, the control unit 703 monitors a packet traffic to see if there is a loss of packets, function degradation or transmission delay, and, therefore, adjusts the packet traffic. Referring to the error control, the control unit 703 discards packets which contain error.

In effect, distribution of packet handling functions into all the subscriber modules instead of merging the functions on one module, enhances the reliability of the packet. In other words, at least, the whole packet handling functions of the packet switch are not hampered even in case a frame handler module goes out of order. Although it simply appears that the distribution of the packet handling functions may give rise to a complexity problem to the subscriber module, progress of hardware integration technology is rapid enough to compensate for the complexity problem.

In addition, the inventive packet switch saves time taken in handling packets. Especially, in case that a sending subscriber and a receiving subscriber happen to be connected to the same ASS-I, packets do not pass the SSW (in the INS 110). Instead, switching of packets is done in the subscriber module.

While the present invention has been described with respect to the preferred embodiments, other modifications and variations may be made without departing from the scope and spirit of the present invention as set forth in the following claims.

What is claimed is:

1. An integrated services digital network (ISDN) switch for switching both packet data and non-packet data, comprising:

a plurality of access switching subsystems including a time switch, for providing interfaces with subscriber equipments by using ISDN standard interfaces;

an interconnection network subsystem including a space switch, connected to the access switching subsystems, for performing space switching and network synchronization; and a central control subsystem, connected to the interconnection network subsystem, for supervising and controlling overall functions performed in each subsystem in the ISDN switch, wherein each of the access switching subsystems is capable of switching the packet data, wherein each of the subscriber subsystems includes a packet handling module, and wherein the packet handling module has:

a plurality of packet handlers for processing packets and handing the packets over to another packet handler for switching; and a packet controller for coordinating an exchange of packets between two packet handlers.

2. The ISDN switch of claim 1, wherein the packet handler has:

a memory means, being connected to the packet controller, for storing packets provided originally from a subscriber; and a control means, being connected to the memory means and the packet controller, for sending packets to the packet controller after fetching the packets from the memory means.

3. The ISDN switch of claim 2, wherein the packet handler further has a link level controller connected both to the memory means and to the time switch, for dealing with the packets by executing a link access protocol for frame relay (LAPF) and for storing the packets to the frame memory.

4. The ISDN switch of claim 3, wherein the packet handler further has a time switch interface connected both to the link level controller and the time switch, for controlling a bit rate in exchanging the packets with the time switch via a highway at a variety of bit rate.

5. The ISDN switch of claim 4, wherein the bit rate ranges from 64 kbps to 1.092 Mbps.

6. The ISDN switch of claim 4, wherein the packet handler further has a buffer connected both to the control means and to the packet controller, for temporarily storing the packets exchanged between the control means and the packet controller, and for controlling a flow of packets that flow therethrough.

7. The ISDN switch of claim 6, wherein the packet controller and the buffer are connected with a 16-bit parallel path including an interrupt line.

8. The ISDN switch of claim 6, wherein the packet handler further has a bus interface means connected both to the buffer and the packet controller, for interfacing the buffer and the packet controller.

9. The ISDN switch of claim 8, wherein the packets are frame relay data.

* * * * *